United States Patent [19]

Cooper et al.

[11] Patent Number: 5,569,959
[45] Date of Patent: Oct. 29, 1996

[54] CLOSURE FOR AN AIR BAG ASSEMBLY

[75] Inventors: Robert Cooper, Oshawa, Canada; Peter Ianazzi, Hampstead; Lawrence R. Nichols, Dover, both of N.H.; Thomas Parker, Imperiala, Mo.

[73] Assignee: David Textron, Inc., Dover, N.H.

[21] Appl. No.: 434,022

[22] Filed: May 3, 1995

Related U.S. Application Data

[63] Continuation-in-part of Ser. No. 267,257, Jun. 29, 1994, Pat. No. 5,451,075.

[51] Int. Cl.⁶ ........................................... B60R 21/16
[52] U.S. Cl. .............................. 280/728.3; 280/732
[58] Field of Search ..................... 280/728.1, 728.2, 280/728.3, 732, 752

[56] References Cited

U.S. PATENT DOCUMENTS

| | | | |
|---|---|---|---|
| 3,640,546 | 2/1972 | Brawn | 280/732 |
| 3,966,227 | 6/1976 | Cameron | 280/752 |
| 4,327,937 | 5/1982 | Scholz et al. | 280/728.3 |
| 4,629,596 | 12/1986 | Coffman | 264/171 |
| 4,705,708 | 11/1987 | Briggs et al. | 428/35 |
| 4,836,576 | 6/1989 | Werner et al. | 280/731 |
| 4,852,907 | 8/1989 | Shiraki et al. | 280/731 |
| 4,952,351 | 8/1990 | Parker et al. | 264/46.4 |
| 5,013,064 | 5/1991 | Miller et al. | 280/731 |
| 5,046,758 | 9/1991 | Rafferty et al. | 280/732 |
| 5,082,310 | 1/1992 | Bauer | 280/732 |
| 5,131,678 | 7/1992 | Gardner et al. | 280/732 |
| 5,154,444 | 10/1992 | Nelson | 280/732 |
| 5,215,330 | 6/1993 | Kurita | 280/728.3 |
| 5,280,947 | 1/1994 | Cooper | 280/728.3 |
| 5,303,951 | 4/1994 | Goestenkors et al. | 280/728.3 |
| 5,378,014 | 1/1995 | Cooper | 280/728.3 |
| 5,421,608 | 6/1995 | Parker et al. | 280/732 |
| 5,451,075 | 9/1995 | Parker et al. | 280/728.3 |

*Primary Examiner*—Paul N. Dickson
*Attorney, Agent, or Firm*—Reising, Ethington, Barnard & Perry

[57] ABSTRACT

A closure for an air bag assembly includes a flexible outer skin and a layer of foam material covering a retainer member that has an air bag deployment opening that is closed by a moveable door. The door overlaps portions of the retainer member to support the door against movement inwardly of the retainer member and allow free hinging movement outwardly of the retainer member for stressing and separating the layer of foam and the outer skin to form a deployment path for the air bag. The moveable door may be retained in the closed position by frangible portions of the retainer member to facilitate manufacture of the closure.

22 Claims, 3 Drawing Sheets

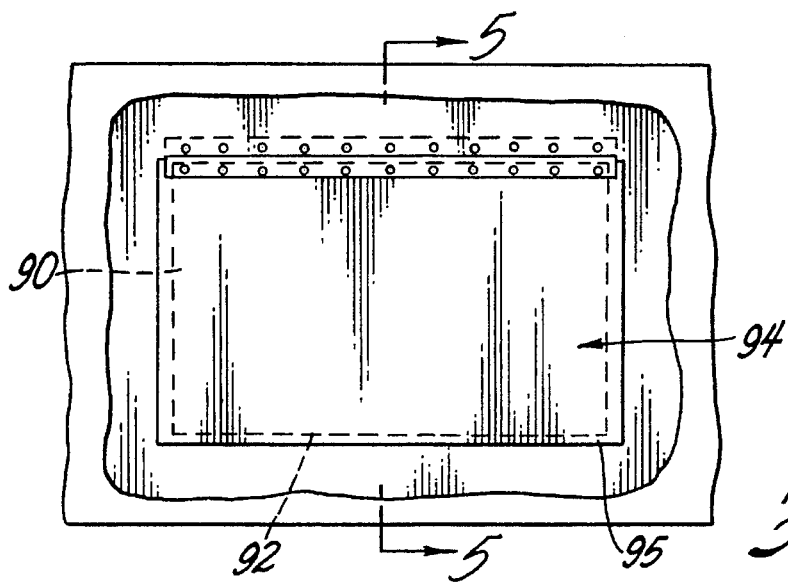
Fig. 4
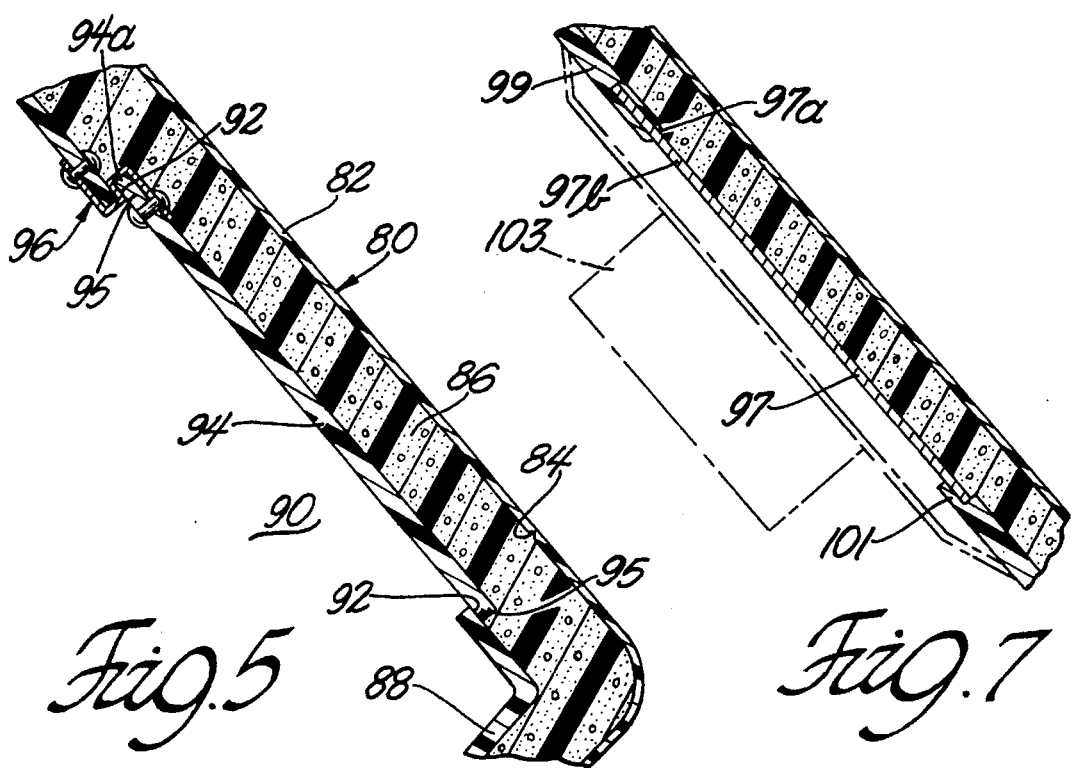
Fig. 5
Fig. 7
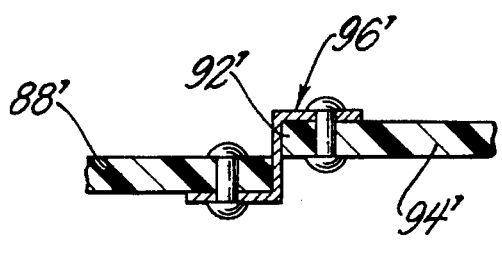
Fig. 6

CLOSURE FOR AN AIR BAG ASSEMBLY

BACKGROUND OF THE INVENTION

This is a continuation-in-part of U.S. patent application Ser. No. 08/267,257 filed Jun. 29, 1994, now U.S. Pat. No. 5,451,075.

This invention relates generally to closures for air bag assemblies and more particularly to such closures that include at least one moveable door that closes an air bag deployment opening and is acted upon by an inflatable air bag to stress and separate a layer of foam and a flexible outer skin for forming a deployment path for the air bag.

U.S. Pat. No. 4,852,907 granted to Kouji Shiraki et al Aug. 1, 1989 discloses a pad for an air bag assembly that comprises a covering of smooth material such as polyvinyl chloride that is backed with a foam layer to form a soft cover for an air bag assembly that hides two doors that swing open when an air bag is deployed. The two doors are not connected or otherwise supported so that the doors can be moved inwardly when an inwardly directed force is applied by an occupant on the outer surface of the pad. See also U.S. Pat. No. 4,836,576 granted to Herbert Werner et al Jun. 6, 1989.

U.S. Pat. No. 5,082,310 granted to David J. Bauer Jan. 21, 1992 discloses an air bag closure of the above noted type in which the doors are physically connected together in order to resist inward collapse of the doors when an inwardly directed force is applied by an occupant on the outer surface of the covering. The Bauer arrangement, however, has a drawback in that the physical connection of the doors that resists inward collapse also resists opening of the doors with the same degree of force.

U.S. Pat. No. 5,131,678 granted to John A. Gardner et al Jul. 21, 1992 and U.S. Pat. No. 5,215,330 granted to Kenji Kurita Jun. 1, 1993 disclose air bag closures of the above noted type that utilize an overlap feature to prevent inward movement of the door or doors in response to the inwardly directed force applied by an occupant. While these closure arrangements avoid the drawback of an interconnection, the arrangements are not entirely satisfactory. For instance, the single door arrangement shown in the Gardner '678 patent has an observable seam line. This is particularly true of the embodiment shown in FIG. 3 that includes a frangible connection for the door that is formed by cutting the panel completely through the skin and foam layers only partly through the backing plate. On the other hand the double door arrangement shown in the Kurita '330 patent does not provide any support for one of the underlying doors.

SUMMARY OF THE INVENTION

An object of the present invention is to provide a closure for an air bag having an outer layer of polymeric material, a foam layer underlying the outer layer, an inner retainer member carrying the foam layer and the outer layer in overlying relationship to an air bag deployment opening in the retainer member, and a moveable door that overlaps portions of the retainer member to support the moveable door against movement inwardly of the retainer member.

Another object of the present invention is to provide a closure for an air bag deployment opening, having an outer layer of polymeric material, a foam layer located within the outer layer, an inner retainer member carrying the foam layer and the outer layer in overlying relationship to the air bag deployment opening and the inner retainer member, and a moveable door having an end portion joined to the retainer member by a metal insert embedded in the end portion of the moveable door; the retainer member having depressed portions to support the moveable door against movement inwardly of the retainer member.

A further object of the present invention is to provide a closure for an air bag the closure having an outer layer of polymeric material, a foam layer located within the outer layer, an inner retainer member having a deployment opening for the air bag and the retainer member carrying the foam layer and the outer layer in overlying relationship to the air bag deployment opening and the inner retainer member including a moveable door formed as two door segments each having portions overlapping portions of the retainer member to support the moveable door against movement inwardly of the inner retainer member in response to loading imposed upon the outer layer of polymeric material.

Another object of the present invention is to provide a closure for an air bag, the closure having an outer layer of polymeric material, a foam layer located within the outer layer, an inner retainer member having an air bag deployment opening, the retainer member carrying the foam layer and the outer layer in overlying relationship to the air bag deployment opening and the inner retainer member including a moveable door having an end hinged to the inner retainer member and having sides overlapping depressed portions of the retainer member to support the moveable door against movement inwardly of the retainer member in response to loading imposed upon the outer layer of polymeric material.

Yet another object of the present invention is to provide a closure for an air bag having an outer layer of polymeric material, a foam layer located within the outer layer and an inner retainer member with an air bag deployment opening therein and carrying the foam layer and the outer layer in overlying relationship to the air bag deployment opening and the inner retainer member supporting a moveable door formed as two door segments; each of the door segments including a first end and a hinge for pivotally connecting the first end to the inner retainer member; and each of the door segments including first and second sides that overlaps the inner retainer member at a support ledge to support the moveable door member against movement inwardly of the retainer member in response to loading imposed upon the outer layer of polymeric material.

Another object of the present invention is to provide a closure for an air bag having an outer layer of polymeric material, a foam layer located within the outer layer and an inner retainer member carrying the foam layer and the outer layer in overlying relationship to the air bag deployment opening and the inner retainer member supporting a moveable door having sides overlapping the inner retainer member for supporting the door against movement inwardly of the inner retainer member in response to external loading imposed on the outer layer.

A feature of the present invention is to provide a closure as set forth in the preceding objects having recessed stops for supporting the door against movement inwardly of the inner retainer.

Another feature of the present invention is to provide a closure as set forth in the preceding objects having shear resistent stops at the sides of the door for supporting the door against movement inwardly of the retainer member.

Another feature of the present invention is that the door is configured to have a single side thereof hinged to the inner retainer member and further being configured to have the sides thereof held in overlapping relationship with the retainer member to form a support that prevents movement of the door inwardly of the retainer member without impeding movement of the door from its supported position on the inner retainer member outwardly in any significant way when the air bag is deployed.

Another feature of the present invention is that shear resistent stops and releasable catches are formed integrally of the retainer to support the door against movement inwardly of the retainer member and retain the door in the closed position during the manufacturing process.

Yet another feature of the present invention is that the door has a metal insert embedded therein and attached to the inner retainer member to form the hinge between the door and the inner retainer member.

Still another feature of the present invention is that the door is a composite of a plastic closure portion for high deflection resistance and a metal insert embedded in the plastic closure portion at one end for attaching the door to an inner substrate and providing a hinge for pivoting movement of the door with respect to the inner retainer member that has more uniform characteristics.

BRIEF DESCRIPTION OF THE DRAWINGS

The above and other objects, features and advantages of the invention will become more apparent from the following description taken in conjunction with the accompanying drawings wherein like references refer to like parts and wherein:

FIG. 4 is an enlarged fragmentary top elevational view of another embodiment of a closure for an air bag assembly embodying the present invention;

FIG. 5 is a sectional view taken along the line 5—5 of FIG. 4 looking in the direction of the arrows;

FIG. 6 is a fragmentary view of an alternative hinge configuration suitable for use in the closure assembly of FIG. 5;

FIG. 7 is a fragmentary sectional view of another embodiment of the invention;

DESCRIPTION OF THE INVENTION

Figure 1:
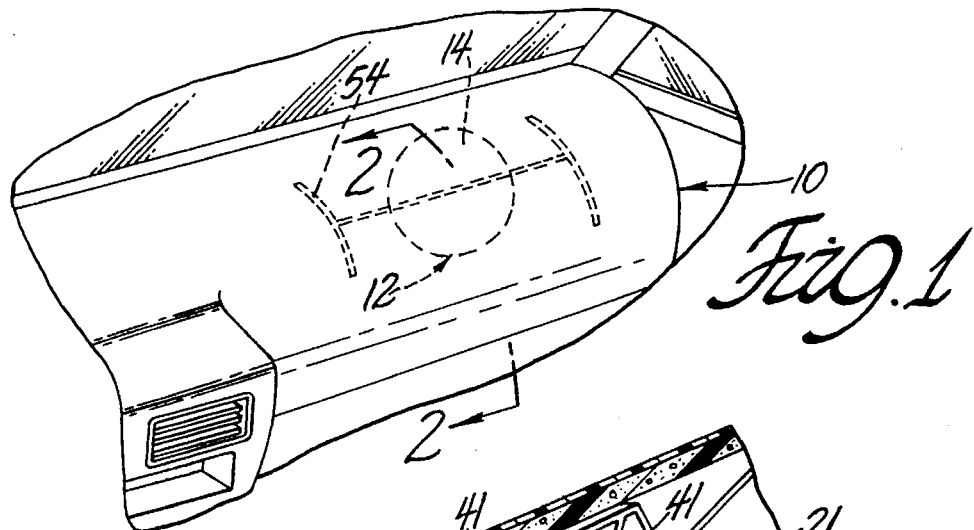
FIG. 1 is a perspective view of a closure for an air bag assembly located within an instrument panel on the passenger side of a motor vehicle.
Figure 2:
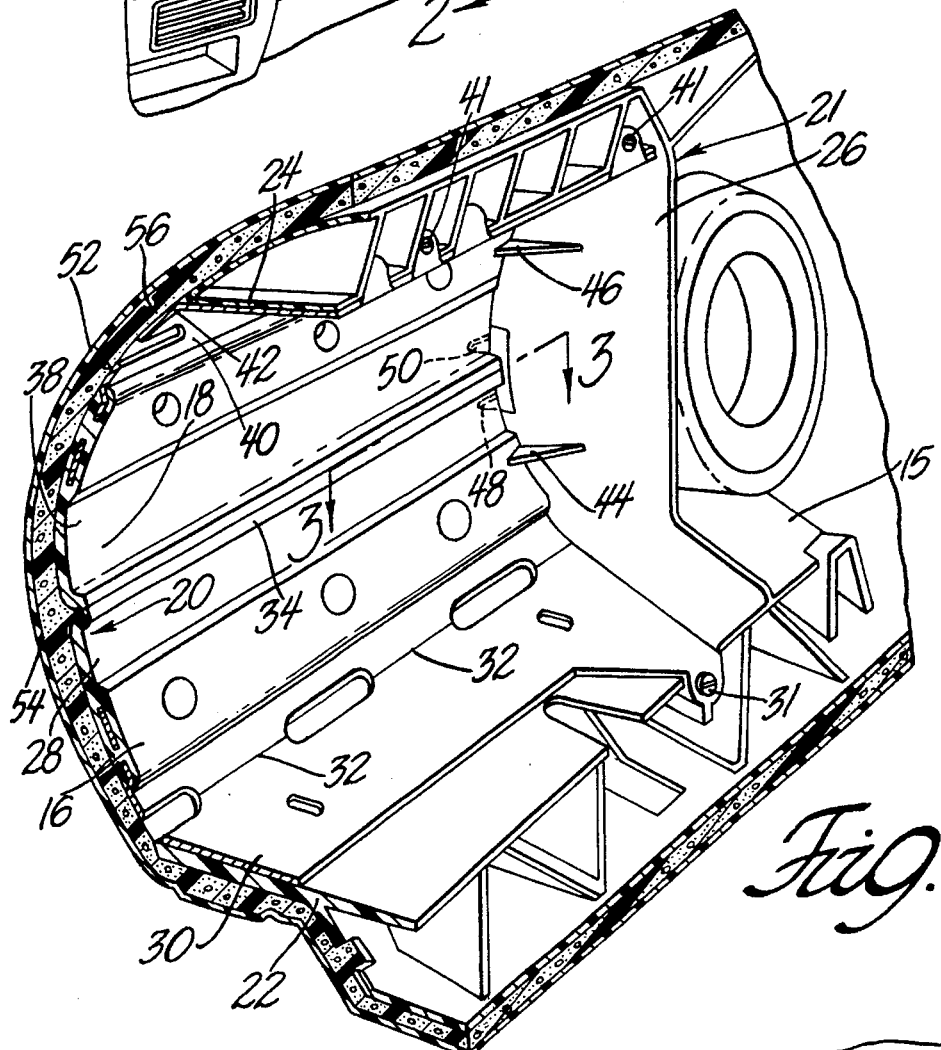
FIG. 2 is an enlarged sectional view taken substantially along the line 2—2 of FIG. 1 looking in the direction of the arrows.
Figure 3:
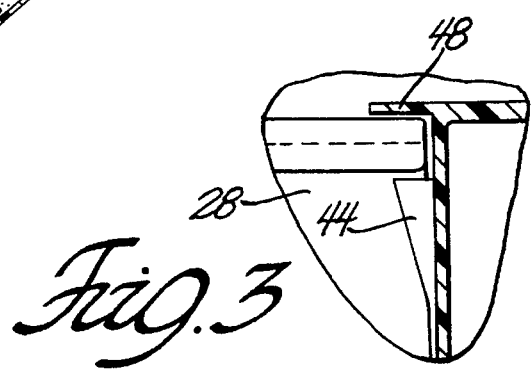
FIG. 3 is a section taken substantially along the line 3—3 of FIG. 2 looking in the direction of the arrows.

Referring now to FIGS. 1 through 3 of the drawing, an instrument panel 10 is illustrated having a closure assembly 12 that covers an air bag assembly 14 of a known type. The closure assembly 12 includes an instrument panel retainer 15 that supports two separate doors 16, 18 that cover an opening 20 through the instrument panel retainer 15. The opening 20 is framed by a rectangular sleeve 21 of the instrument panel retainer 15. The rectangular sleeve 21 comprises two flat, parallel, vertically spaced, elongated side walls 22 and 24 that are connected by a flat vertical side wall 26 at each end, one of which is shown in FIG. 2.

The retainer 15 is molded of plastic material and the rectangular sleeve 21 is molded as an integral part of the retainer 15.

The door 16 comprises a closure panel 28 of molded thermoplastic material such as a polycarbonate/ABS blend, and a metal insert 30 of steel or aluminum. The metal insert 30 has an offset end portion embedded in an end portion of the closure panel 28 that is increased in thickness to accommodate the offset end of metal insert 30. The opposite end portion of the metal insert 30 is generally flat and shaped so that it engages the lower side wall 22. It has a plurality of generally perpendicular tabs 31 at the edge. One of the tabs 31 is shown in FIG. 2. The door 16 is attached to the retainer 15 by the tabs 31 and fasteners, such as screws which fasten the tabs 31 of the metal insert 30 to vertical portions of the retainer 15 as shown in FIG. 2.

The metal insert 30 further comprises an intermediate portion that is angularly shaped and acts as a hinge for swinging the thermoplastic closure panel 28 and the offset end portion of the metal insert 30 that is embedded in the thermoplastic closure panel 28 from the closed vertical position shown in FIG. 2 to an open horizontal position (not shown) in response to air bag deployment. The hinge action may be defined and/or enhanced in any suitable manner, for instance by creasing the intermediate portion of the metal insert 30 and perforating the intermediate portion with a plurality of elongated holes along the crease to provide a well defined hinge line 32 as shown in FIG. 2.

The free end of the thermoplastic closure panel 28 has an inward flange 34 to increase the rigidity at the free end of the door 16. The terminus of flange 34 is rounded to avoid injury to the air bag that is part of the air bag assembly 14 when the air bag is deployed.

The door 18 also comprises a closure panel 38 of molded thermoplastic material such as a polycarbonate/ABS blend, and a metal insert 40 of steel or aluminum. The metal insert 40 also has an offset end portion embedded in an end portion of the closure panel 38 that is increased in thickness to accommodate the offset end of the metal insert 30. The opposite end portion of the metal insert 40 is also generally flat shaped so that it engages the upper side wall 24. The metal insert 40 also has generally perpendicular tabs 41 for attaching the door to vertical portion of the retainer 15 by means of the tabs 41 and screws or other suitable fasteners as shown in FIG. 2.

The metal insert 40 also further comprises an angular intermediate portion that acts as a hinge for swinging the thermoplastic closure panel 38 and the offset end portion of the metal insert 40 embedded in it from the closed vertical position shown in FIG. 2 to an open horizontal position (not shown). As before the hinge may be enhanced in a suitable manner, such as creasing the intermediate portion of the metal insert 40 and providing a plurality of elongated holes (not shown) along the crease to provide a well defined hinge line 42.

The free end of the thermoplastic closure panel 38 has a rounded inward flange that increases the rigidity at the free end of the door 18 while avoiding damage to the air bag during deployment.

The vertical end walls 26 forming part of the rectangular sleeve 21 of the retainer 15 are each provided with two rear stops 44 and 46 and two front catches 48 and 50 at the surface of the retainer 15 that are purposely weaker than the rear stops 44 and 46. The rear stops 44 (one shown) engage the inner surface of the door 16 at the thick end of the closure panel 28 to support the door 16 against inward movement, such as that caused by an occupant pushing inwardly on the instrument panel in the area of the door 16.

Similarly the rear stops 46 (one shown) engage each end of the door 18 at the thick end of the closure panel 38 to support the door 18 against inward movement, such as that caused by an occupant pushing inwardly on the instrument panel in the area of the door 18. The rear stops 44 and 46 are wedge shaped as shown in FIG. 3 or otherwise suitably shaped so that the stops 44 and 46 are relatively rigid and shear resistent. The rear stops 44 and 46 are also recessed so that the outer surfaces of the closure panels 28 and 38 do not protrude outwardly of the outer surface of the retainer 15 surrounding the air bag opening 20. This enhances the appearance of the instrument panel 10 and at the same time permits a full thickness of resilient foam material padding over the doors 16 and 18.

The front catches 48 (one shown) engage the outer surface of the door 16 at each end near the free end of the closure panel 28 to hold the door 16 in the closed position shown in FIG. 2 while the first catches 50 (one shown) engage the outer surface of the door 18 at each end near the free end of the closure panel 38 to hold the door 18 in the closed position shown in FIG. 2.

The front catches 48 and 50 are designed to hold the doors 16 and 18 closed during the manufacturing process but offer very little if any resistance to the doors 16 and 18 being pushed open by deployment of the air bag. Thus the front catches 48 and 50 are formed as thin webs or otherwise suitably shaped to provide little shear resistance to the opening of the doors 16 and 18 upon deployment of the air bag. While the front catches 48 and 50 may be designed to shear off during air bag deployment, the front catches 48 and 50 are preferably sufficient resilient to allow the doors 16 and 18 to be snapped past the front catches 48 and 50 to the closed position shown in FIG. 2. Such resilient catches facilitate the manufacturing process by permitting the doors 16 and 18 to be moved to and then held in the closed position of FIG. 2 while the metal inserts 30 and 40 are fastened to the retainer. This resilient feature also eliminates any debris from the front catches 48 and 50 when the air bag is deployed.

In accordance with the present invention the closure assembly 12 further includes a flexible outer shell or skin layer 52 preferably formed of a thermoplastic polymer such as polyvinyl chloride, thermoplastic urethane or thermoplastic olefin. The skin layer 52 has a weakened seam 54 formed in its interior surface that has an H-shape corresponding to the location of the aligned side edges of the doors 16 and 18 and the location of the juxtaposed front edges of these doors. The space between the retainer 15, doors 16 and 18 and the outer skin layer 52 is filled with a layer of foam material 56 such as urethane foam or polyvinyl chloride foam. The layer of foam material 56 supports the weakened area defined by the weakened seam 54 so as to prevent it from sinking to become visually observable by an occupant. However, in the past it has been difficult to form an underlying support for the foam material that would resist forces imposed on the weakened area of the skin layer 52 from the outside of the instrument panel or other interior trim assembly for a vehicle embodying a cover assembly for an air bag within the air bag assembly.

The arrangement of stops 44, 46 and catches 48, 50 provides a strong underlying support for the foam material 56 via doors 16, 18 while at the same time the arrangement facilitates the manufacturing process particularly in the case in situ formation of the layer of foam material 56 in a manner that does not impede air bag deployment in any significant way.

In order to resist forces imposed on the weakened skin layer 52, the doors 16, 18 of the present invention are supported on the rear stops 44 and 46 which are rigid and shear resistent. Moreover, the thermoplastic closure panels 28 and 38 themselves are relatively rigid and resist deflection. Thus the present invention thereby resists displacement of all portions of the doors 16, 18 inwardly of the instrument panel retainer 15 in a direction toward the air bag in the assembly 14.

Moreover in order to facilitate the manufacturing process, the doors 16 and 18 are held in the closed position by the front catches 48 and 50 so that the doors 16 and 18 are fastened to the substrate 15 easily. The substrate 15 with the doors 16 and 18 attached can then be handled without danger of the doors 16 and 18 opening and being damaged before the outer skin layer 52 and intermediate layer of foam material 56 is in place. As indicated above, the layer of foam material 56 fills the space between the substrate 15 and outer skin layer 52. This is conventionally done by placing the skin layer 52 in a lower mold and attaching the substrate 15 to an upper mold that is closed on the lower mold to form a mold cavity for molding the intermediate layer of foam material 56.

The front catches 48 and 50 also facilitate such an in situ formation of the foam material 56 since the doors 16 and 18 are held in the closed position on the substrate 15 as the foam material 56 is formed in place in the mold cavity.

Furthermore after the closure assembly 12 is completed the front catches 48 and 50 beneath the outer skin layer 52 and the intermediate layer of foam material do not impede air bag deployment in any significant way because the front catches 48 and 50 offer very little if any resistance to the doors 14 and 16 being pushed open by deployment of the air bag.

The operation of the illustrated closure assembly 12 includes directing an inflatant into the air bag causing it to engage the inner surfaces of the doors 16 and 18. The air bag thus forces the doors 16, 18 apart from one another in an outward swinging movement. The doors 16, 18 move from the underlying rear stops 44 and 46 of the instrument panel retainer 15 and either past or through the face catches 48 and 50 depending on their resilience. Each of the doors 16, 18 pivots about its respective hinge line 32, 42 so that the free edges of the doors 16, 18 initially compress the layer of foam material 56 and then stress and separate the layer of foam 56 and the outer skin 52 by directing a separating force along the middle or cross bar segment of the weakened seam 54. At the same time the side edges of the doors 16 and 18 act upwardly on the side segments of the H-shaped weakened seam 54 to break the skin at those locations. Further swinging movement of the doors 16, 18 causes them to separate both the layer of foam material 56 and the outer skin layer 52 to form an opening generally corresponding to the opening 20 formed in the instrument panel retainer 15.

While the invention is disclosed in association with an instrument panel retainer 15, it is equally suitable for use in a cover assembly for an air bag assembly mounted on a steering column to provide drive side protection. For example see U.S. Pat. No. 5,131,678 discussed above.

Referring now to the embodiment of the invention shown in FIGS. 4 and 5, an overlapped door configuration is shown for use with a cover assembly 80 for an air bag in which the dual door arrangement of FIGS. 1–3 is replaced with a single door that is located below a weakened seam line having a U-shaped configuration. The cover assembly 80 includes an outer skin layer or shell 82 having a U-shaped depression 84 formed in the inner surface thereof to form a weakened seam that will separate readily during deployment of an air bag through the cover assembly 80. The cover assembly 80 further includes a resilient foam layer 86 that underlies the outer skin layer 82 and fills the depression 84 so as to prevent the depression 84 from being visually observable from exteriorly of the cover assembly 80. The cover assembly 80 further includes an interior retainer member 88 having an opening 90 formed therein. The opening 90 is bounded by a ledge surface 92 formed therearound. A single moveable door 94 has a peripheral edge portion 95 that is supported on the ledge surface 92 in overlapping relationship therewith as shown in FIGS. 4 and 5. Accordingly the door 94 is supported against movement thereof interiorly of the cover assembly 80 as was the case of the two door embodiment of FIGS. 1–3.

The front edge 94a of the door 94 is connected by an S-shaped hinge 96 that has a center segment that covers a forward edge portion of the door 94 and also covers an upper edge of the instrument panel retainer 88. Opposite ends of the hinge 96 are connected, respectively, to the forward edge portion and the upper edge by a plurality of spaced fasteners, representatively shown as a rivet with it being understood that other fasteners such as screws, upset bosses or the like would also be satisfactory for use with the invention.

As was the case with the previously described embodiment of FIGS. 1–3, this embodiment provides a door for a weakened seam type closure of a supplemental impact restraint system. The door overlaps an interiorly located retainer member such as an instrument panel retainer or a cover member in a driver's side cover assembly of a supplemental impact restraint system. As in the embodiments of FIGS. 1–3, the single door 94 is arranged to have less resistance to opening than the prior art arrangements in which a door is connected by a frangible member to an associated retainer member or to another door for preventing inward displacement of the door from exteriorly of the cover assembly by either finger poking or head impacts.

Another embodiment of the present invention is shown in FIG. 6 wherein an alternative hinge design is illustrated. In this embodiment the forward edge of the door 94' is located above but to one side of a retainer member 88'. A hinge 96' is provided having an inner end connected to the inner surface of the retainer member 88' by a plurality of spaced fasteners, one of which is shown. The inner end is connected to a transversely directed segment 92' that is also connected to the outer end of the hinge 96' for connection to the outer surface of the door 94' by a plurality of fasteners, one shown. In this embodiment, there is no ledge support at the hinged side of the door region of the hinge, but the hinge is of reduced cost since it omits the center segment of the S-shaped hinges in the embodiment of FIGS. 4 and 5. The ledge support at the sides and at the overlap, however, provide sufficient support to prevent inward displacement of the doors in the cover assembly.

In all of the embodiments, the doors can be formed from metal such as steel or aluminum. In such case the hinge constructions 24 can be formed as an integrated part of the door retainer. Such a construction is shown in the embodiment of FIG. 7 comprising a metal door 97 having one edge embedded in a molded plastic retainer 99. The front and side edges of the door 94 are rested on a shoulder 101 formed on the retainer. The thinner section door 97 will bend at 97a to provide upward pivotal movement of the door 97 when an air bag is deployed from a canister 103 against the underside surface 97b of the door 97.

Alternatively, the doors or door can be made of a suitable plastic material like one of the materials of construction used for the retainer member. In such case the plastic door can be connected to the retainer by a separately assembled hinge made of either steel or aluminum.

Alternatively, the doors or door can be made of such plastic material with the hinge integrated therewith, as described in the embodiment of FIG. 7.

The cover assembly can be made as follows with it being understood that this proposal is merely representative of one preferred embodiment of the invention. In the case of the single door embodiment of FIGS. 4 and 5, a retainer member is milled to form a through cut on all four sides of an opening. Galvanized metal strap material is formed as a hinge that is either S-shaped as shown in FIGS. 4 and 5 or Z-shaped as shown in FIG. 6. An oversized door is formed to overlap the retainer on all four sides or at least two sides. The hinged end of the over sized door is then connected to the hinge by suitable rivets and metal washers and the hinge is connected to the hinging edge of the retainer side by like rivets and metal washers.

Figure 8:
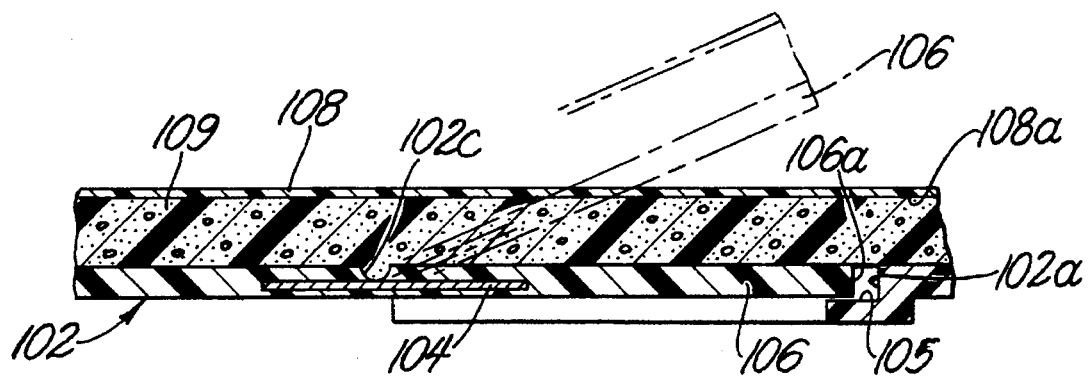
FIG. 8 is a fragmentary sectional view of another embodiment of the invention.

Another cover assembly 100 is illustrated in the embodiment of FIG. 8. In this embodiment a retainer or insert 102 is premolded with a metal insert 104 formed integrally therewith on one side of an integral single door 106 of retainer 102. The single door segment 106 is U-shaped and is spaced from a U-shaped edge 102a of the retainer 102 to be able to swing upwardly in a pivotal movement about the metal insert 104 that bends in a hinging action. The retainer 102 preferably has a U-shaped ledge 105 below the edge 102a for supporting the door segment 106 in the closed position. In order to facilitate the hinging action the preformed retainer 102 includes a depression 102c therein extending along the hinged end of the single door segment at the insert 104. As in the previously described embodiments, the cover assembly 100 includes an outer skin layer or shell 108 having a weakened tear seam 108a formed therein in a U-shape corresponding to that of the outer edge 106a of the single door 106. The space between the retainer 102 and the outer skin layer 108 is filled with a layer of resilient foam material 109. The strength of the metal insert 104 is selected to limit the amount of inward deflection of the door 106 inwardly of the cover assembly 100 when an external force is directed thereagainst, while enabling the door 106 to freely hinge outwardly as shown in hidden broken lines in FIG. 8 so as to stress and separate the layer of foam and outer skin for forming an air bag deployment path.

Figure 9:
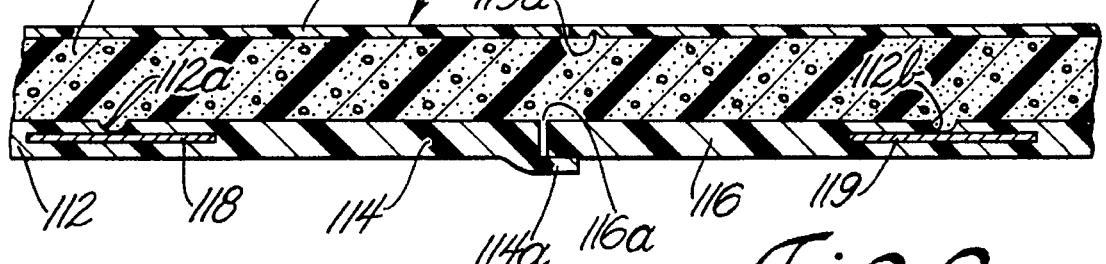
FIG. 9 is a fragmentary sectional view of another embodiment of the invention.

The embodiment of FIG. 9 is like that of FIG. 8. In this embodiment two integral U-shaped doors are formed in a cover assembly 110. More specifically, the cover assembly 110 includes a retainer or insert member 112 having first and second integral door members 114, 116 each of which are formed integrally with the retainer 112 at a hinged end thereof. Each of the hinged ends is formed in part by a metal insert 118, 119 that underlies a weakened section defined by separate depressions 112a, 112b in the retainer member, respectively overlying the embedded metal inserts 118, 119. The weakened depressions 112a, 112b extend along the width of the hinged end of each of the integral door members 114, 116 to provide for hinging action at the hinged ends of the first and second integral doors during deployment of an air bag through the cover assembly. In order to further prevent inward movement of the doors 114, 116 further support (in addition to that of the inserts 118 at the hinged ends thereof) is provided by an overlap between adjacent ends of the doors 114, 116 as defined by a bent end 114a on the door 114 that is bent inwardly of the doors 114, 116 and arranged to support the underside of the free end 116a of the door 116. As in the previously described embodiments, the cover assembly 110 includes an outer skin layer or shell 115 having a weakened tear seam 115a formed therein in an H-shape corresponding to that of the side edges and free ends of the doors 114, 116. The space between the retainer 112 and the outer skin layer 118 is filled with a layer of resilient foam material 117. The strength of the metal inserts 118 is selected to limit the amount of inward deflection of the doors 114, 116 inwardly of the cover assembly 110 when an external force is directed thereagainst.

Figure 10:
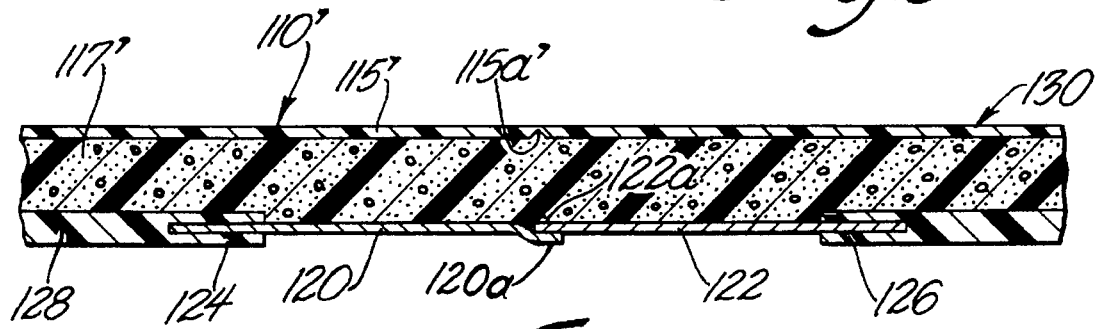
FIG. 10 is a fragmentary sectional view of another embodiment of the invention.

The embodiment of FIG. 10 is like the embodiment of FIG. 9 except that the doors 114 and 116 and the metal inserts 118 are replaced by two metal doors 120, 122 that are molded in place on the peripheral front and rear edges 124, 126 of the interior retainer 128 of a cover assembly 130 like that shown in the embodiment of FIGS. 1–3. The other components of the cover assembly 130 that are the same as those described in the embodiment of FIG. 9 are designated the same as in the FIG. 9 embodiment but with the reference numerals primed. In the FIG. 10 embodiment, the metal doors 120, 122 are overlapped at their free ends 120a, 122b to provide additional support against inward movement of the insert door structure when external forces are directed against the outer surface of the outer skin layer 115'.

In accordance with the embodiments of the invention shown in FIGS. 7, 8, 9 and 10 the means to provide support against inward movement of the door components of the cover assembly for a supplemental impact restraint system is characterized as including a thermoplastic or thermoset inner retainer having doors integrally formed with the retainer that open up and bend out of the way to form a deployment path for an air bag to inflate. In order to prevent the doors from collapsing, sagging or deforming, unconnected ledge support is provided in part by the provision of hinge inserts formed integrally of the doors at the hinged ends thereof. In the case of two door members located below a H-shaped weakened hidden seam in an outer skin layer of a cover assembly, an overlapping support is provided at the free end of the door members. In accordance with the invention the single door member embodiment can have its free end overlapped by the insert. While the doors in the embodiments of FIGS. 7, 8, 9 and 10 are integrally formed with the retainer, in FIG. 11 another embodiment is shown in which the doors are preformed with a hinged end 132 that has spaced holes 134 formed therein, one hole illustrated in the section of FIG. 11. The holes 134 are fit over a plurality of spaced plastic bosses 136 at the hinging edge 138 of an insert member 140 and the bosses are upset by a combination of heat and pressure so as to flow over the insert causing it to be partially encapsulated and secured in place to the door insert as shown at 142 in FIG. 11.

Figure 11:
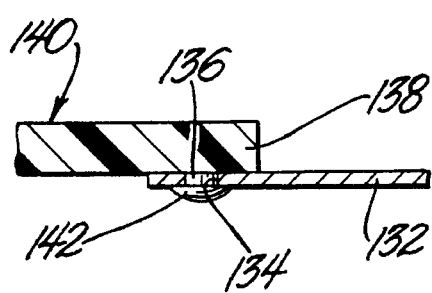
FIG. 11 is a fragmentary view of an alternative hinge configuration suitable for use in the closure assemblies of FIGS. 7, 9, 9 and 10.
Figure 12:
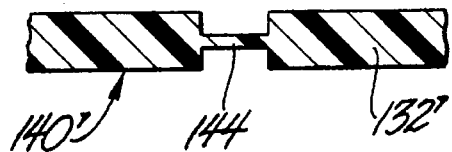
FIG. 12 is a fragmentary view of another alternative hinge design suitable for use in the closure assemblies of FIGS. 7, 8, 9 and 10 embodiment of the invention.

Yet another variation would be to integrally form the hinged end to the insert by a thin strip of plastic as shown at 144 in FIG. 12, in which corresponding retainer and doors have the same reference numerals as in FIG. 11, but primed.

In this case the door 132', in combination with the thin section of thermoplastic material joins the door 132' to the retainer 140' and is operative to bend to form a hinging mechanism about which the door 132' can pivot open during deployment of an air bag through the cover assembly.

While this invention has been shown and described a container for the air bag in its predeployment folded cushion disposition and a cover assembly for the air bag, it should be recognized that the container and retainer can be unitized into one member forming both a housing for the air bag and a retainer component within the cover assembly.

Thus, the present invention provides a supplemental impact restraint system having an air bag hidden by a cover assembly with pivotal doors that are supported against inward movement including collapse, sag or deformation thereof when an external force is imposed on the outer surface of the cover assembly. The invention is further arranged such that the pivotal doors of the cover assembly are unconnected and thereby free to pivot apart within an opening formed within an insert member with the only resistance to such pivoting movement being that of the hinging force and the force required to penetrate through overlying foam material and a weakened seam formed in the outer skin layer or shell of the cover assembly.

Examples of suitable materials for the outer skin layer includes polyvinyl chloride or other thermoplastic materials such as thermoplastic elastomers or thermoplastic olefins and thermoset materials such as spray urethane.

Examples of suitable foam materials include low modulus elastomers such as reaction injection molded urethane material having a flexural modulus in the range of 20,000–80,000 psi at 75° F. Other comparable urea based or vinyl based foam are equally suitable for use with the invention. The use of inserts with inwardly supported unconnected door or doors can be used with other cover assemblies in which the foam layer is omitted entirely and wherein the cover material is formed by other materials including fabrics (both natural and synthetic), leather and any other material that will provide a desired decorative appearance overlying an air bag assembly.

While the foregoing is a complete description of preferred embodiments of the present invention, it should be understood that various changes and modifications may be made without departing from the spirit and scope of the present invention as set forth in the following claims.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A closure for an air bag having an outer layer of polymeric material, a foam layer located within said outer layer and an inner retainer member having an air bag deployment opening preformed therein and the inner retainer member carrying said foam layer and said outer layer in overlying relationship to the air bag deployment opening in the inner retainer member and a moveable door that is covered by the outer layer of polymeric material and the foam layer characterized by:

said moveable door having sides thereof cooperating with said inner retainer member for supporting said moveable door against movement inwardly of said inner retainer member and for supporting said moveable door for free movement thereof from its supported position on said inner retainer member, the inner retainer member having shaped stops that taper inwardly and are relatively rigid and shear resistant, and the sides of the moveable door cooperating with the stops for retaining the moveable door in its supported position on the inner retainer member.

2. The closure as defined in claim 1 wherein the stops are wedge shaped for shear resistance.

3. The closure as defined in claim 1 wherein the moveable door is formed by two door segments each having an end attached to said inner retainer member and opposite sides cooperating with said inner retainer member for supporting said door segment against movement inwardly of said inner retainer member.

4. The closure as defined in claim 1 wherein the moveable door is a composite comprising a plastic closure portion and a metal insert embedded in the plastic closure portion at one end for attaching the moveable door to the inner retainer member.

5. The closure as defined in claim 4 wherein the stops cooperate with the plastic closure portion.

6. A closure for an air bag having an outer layer of polymeric material, a foam layer located within said outer layer and an inner retainer member having an air bag deployment opening preformed therein and the inner retainer member carrying said foam layer and said outer layer in overlying relationship to the air bag deployment opening in the inner retainer member and a moveable door that is covered by the outer layer of polymeric material and the foam layer characterized by:

said moveable door having sides thereof cooperating with said inner retainer member for supporting said moveable door against movement inwardly of said inner retainer member and for supporting said moveable door for free movement thereof from its supported position on said inner retainer member, the inner retainer member having shaped stops that are relatively rigid and shear resistant, the sides of the moveable door cooperating with the stops for retaining the moveable door in its supported position on the inner retainer member, and the inner retainer member having a sleeve portion defining the air bag deployment opening and the shaped stops being attached to opposite sides of the sleeve portion in depressed positions so that the door does not protrude outwardly of the inner retainer member.

7. The closure as defined in claim 6 wherein the sleeve portion comprises two flat spaced side walls that are connected by a flat end wall at each end, and the stops are located on the end walls.

8. The closure as defined in claim 7 wherein the moveable door is a composite comprising a plastic closure portion and a metal insert embedded in the plastic closure portion at one end for attaching the moveable door to one of the side walls of the inner retainer member.

9. The closure as defined in claim 8 wherein the stops cooperate with the plastic closure portion.

10. A closure for an air bag having an outer layer of polymeric material, a foam layer located within said outer layer and an inner retainer member having an air bag deployment opening preformed therein and the inner retainer member carrying said foam layer and said outer layer in overlying relationship to the air bag deployment opening in the inner retainer member and a moveable door that is covered by the outer layer of polymeric material and the foam layer characterized by:

said moveable door having sides cooperating with said inner retainer member for supporting said moveable door against movement inwardly of said inner retainer member and for supporting said moveable door for free movement thereof from its supported position on said inner retainer member, the inner retainer member having stops, the sides of the moveable door cooperating with the stops for supporting the moveable door inwardly of the inner retainer member, and the inner retainer member having catches for retaining the moveable door in a closed position during the manufacturing process.

11. The closure as defined in claim 10 wherein the stops have a shear resistance and the catches have a shear resistance that is less than the shear resistance of the stops.

12. The closure as defined in claim 10 wherein the catches are resilient.

13. The closure as defined in claim 12 wherein the catches are sufficiently resilient to permit the moveable door to snap past the catches to facilitate manufacture and to reduce debris from the catches as a result of air bag deployment.

14. The closure as defined in claim 12 wherein the moveable door is a composite comprising a plastic closure portion and a metal insert embedded in the plastic closure portion at one end for attaching the moveable door to the inner retainer member.

15. A closure for an air bag having an outer layer of polymeric material, a foam layer located within said outer layer and an inner retainer member having an air bag deployment opening preformed therein and the inner retainer member carrying said foam layer and said outer layer in overlying relationship to the air bag deployment opening in the inner retainer member and a moveable door covered by the outer layer and the foam layer characterized by:

said moveable door having an end attached to said inner retainer member and having sides opposite each other;

said inner retainer member having stops cooperating with the opposite sides of the moveable door member for supporting the moveable door against movement inwardly of said inner retainer member, and said inner retainer member having catches cooperating with the opposite sides of the moveable door for retaining the moveable door in its supported position on the inner retainer member.

16. The closure as defined in claim 15 wherein the catches are resilient.

17. The closure as defined in claim 16 wherein the catches are sufficiently resilient to permit the moveable door to snap past the catches to facilitate and manufacture and to reduce debris from the catches as a result of air bag deployment.

18. The closure as defined in claim 15 wherein the moveable door is a composite comprising a plastic closure portion and a metal insert embedded in the plastic closure portion at one end for attaching the moveable door to the inner retainer member.

19. The closure as defined in claim 15 wherein the moveable door is formed by two door segments each having an end attached to said inner retainer member and opposite sides cooperating with said stops and said catches.

20. A closure for an air bag having an outer layer of polymeric material, a foam layer located within said outer layer and an inner retainer member having an air bag deployment opening preformed therein and the inner retainer member carrying said foam layer and said outer layer in overlying relationship to the air bag deployment opening in the inner retainer member and a moveable door covered by the outer layer and the foam layer characterized by:

said moveable door having an end attached to said inner retainer member and having sides opposite each other;

said inner retainer member having stops cooperating with the sides of the moveable door member for supporting the moveable door against movement inwardly of said inner retainer member, said inner retainer member having catches cooperating with the opposite sides of the moveable door for retaining the moveable door in its supported position on the inner retainer member, and the inner retainer having a rectangular sleeve portion defining the air bag deployment opening and the stops being located in depressed positions on opposite side walls of the sleeve portion so that the door does not protrude outwardly of the inner retainer member.

21. The closure as defined in claim 20 wherein the stops are wedge shaped for shear resistance.

22. The closure as defined in claim 20 wherein the stops have a shear resistance and the catches have a shear resistance that is less than the shear resistance of the stops.

* * * * *